(12) United States Patent
Califano et al.

(10) Patent No.: US 7,938,141 B2
(45) Date of Patent: *May 10, 2011

(54) SINGLE COMPONENT TWO-STAGE REGULATOR

(75) Inventors: Paul J. Califano, Cairo, GA (US); Michael J. Califano, Cairo, GA (US)

(73) Assignee: Vision Tech International LLP, Tallahassee, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 12/885,449

(22) Filed: Sep. 18, 2010

(65) Prior Publication Data

US 2011/0079287 A1   Apr. 7, 2011

Related U.S. Application Data

(63) Continuation of application No. 12/651,896, filed on Jan. 4, 2010.

(60) Provisional application No. 61/247,943, filed on Oct. 1, 2009.

(51) Int. Cl.
*F16K 31/143* (2006.01)

(52) U.S. Cl. .............. 137/505.25; 137/494; 137/495; 137/505.28; 137/906; 137/907; 137/908; 128/205.24; 128/204.26

(58) Field of Classification Search .............. 137/12, 137/14, 494, 495, 505.12, 505.25, 505.28, 137/906, 907, 908; 128/205.24, 204.26, 128/201.27, 201.28
See application file for complete search history.

(56) References Cited

U.S. PATENT DOCUMENTS

| | | | | | |
|---|---|---|---|---|---|
| 1,948,027 | A | * | 2/1934 | Deming | 137/505.12 |
| 1,978,465 | A | * | 10/1934 | Lindbloom | 137/505.12 |
| 2,057,150 | A | * | 10/1936 | Kehl et al. | 137/505.12 |
| 2,283,355 | A | * | 5/1942 | Erickson | 137/505.12 |
| 2,306,060 | A | * | 12/1942 | Jacobsson | 222/6 |
| 2,362,352 | A | * | 11/1944 | Buttner | 137/505.12 |
| 2,565,560 | A | * | 8/1951 | Jacobsson | 137/12 |
| 2,642,701 | A | * | 6/1953 | Goodner | 137/505.12 |
| 2,662,348 | A | * | 12/1953 | Jacobsson | 137/505.12 |
| 2,770,252 | A | * | 11/1956 | Bass, Sr. | 137/505.12 |
| 2,908,158 | A | * | 10/1959 | Jacobsson | 73/46 |
| RE25,122 | E | * | 2/1962 | Page | 128/205.24 |
| 3,044,486 | A | * | 7/1962 | Miller, Jr. | 137/505.42 |
| 3,074,426 | A | * | 1/1963 | Billington | 137/505.25 |
| 3,244,196 | A | * | 4/1966 | Replogle | 137/557 |
| 3,303,860 | A | * | 2/1967 | Godfrey et al. | 141/21 |

(Continued)

*Primary Examiner* — Stephen M Hepperle
*Assistant Examiner* — William McCalister
(74) *Attorney, Agent, or Firm* — American Patent Agency; Daniar Hussain

(57) ABSTRACT

Disclosed is a cylindrical, single-component two-stage regulator for controlling a pressure and a flow rate of a gas. The regulator includes a housing for holding the two stages having an ingress adapted for connection to a source of gas at a high input pressure and an egress adapted for supplying gas at a lower output pressure than the high input pressure; a first stage for reducing the pressure of the gas from the high input pressure to a fixed intermediate pressure; and a second stage for reducing the pressure of the gas from the fixed intermediate pressure to the lower output pressure and regulating the flow rate of the gas out of the egress. One application of the present invention is for use in SCUBA (Self-Contained Underwater Breathing Apparatus) applications, where it replaces the traditional two-component user-adjustable regulator. The regulator may be made out of stainless steel, and is small enough to fit into a user's mouthpiece.

14 Claims, 31 Drawing Sheets

U.S. PATENT DOCUMENTS

| | | | | |
|---|---|---|---|---|
| 3,307,597 | A * | 3/1967 | Shugarman | 141/18 |
| 3,339,581 | A * | 9/1967 | Courtot | 137/505.46 |
| 3,437,109 | A * | 4/1969 | Egerer et al. | 137/505.25 |
| 3,719,160 | A * | 3/1973 | Christianson | 116/70 |
| 3,783,891 | A * | 1/1974 | Christianson | 137/491 |
| 4,450,858 | A * | 5/1984 | Acomb | 137/505.37 |
| 4,484,695 | A * | 11/1984 | Fallon et al. | 222/23 |
| 4,996,982 | A * | 3/1991 | Williamson | 128/205.24 |
| 5,074,298 | A * | 12/1991 | Arnoth | 128/204.18 |
| 5,203,371 | A * | 4/1993 | Teay | 137/460 |
| 5,251,618 | A * | 10/1993 | Christianson | 128/205.24 |
| 5,465,750 | A | 11/1995 | Wang | |
| 5,645,055 | A * | 7/1997 | Danon | 128/204.25 |
| 5,665,894 | A * | 9/1997 | Baker | 73/1.05 |
| 5,735,269 | A * | 4/1998 | Preece | 128/205.24 |
| 5,740,833 | A * | 4/1998 | Olds et al. | 137/505.12 |
| 5,755,254 | A * | 5/1998 | Carter et al. | 137/340 |
| 5,797,425 | A * | 8/1998 | Carter et al. | 137/505.46 |
| 5,911,220 | A * | 6/1999 | Morgan et al. | 128/205.24 |
| 5,996,617 | A * | 12/1999 | Olds et al. | 137/505.46 |
| 5,996,625 | A * | 12/1999 | Collado et al. | 137/614.19 |
| 7,080,655 | B2 * | 7/2006 | Jacksier et al. | 137/14 |
| 7,171,980 | B2 | 2/2007 | Angelini et al. | |
| 7,287,548 | B2 * | 10/2007 | Bleys et al. | 137/613 |
| 7,347,206 | B2 * | 3/2008 | Pedemonte | 128/204.26 |
| 7,543,584 | B2 * | 6/2009 | Brookman | 128/205.11 |
| 7,565,911 | B2 * | 7/2009 | Bonta, Jr. | 137/14 |
| 2006/0157122 | A1 * | 7/2006 | Kawamura et al. | 137/613 |
| 2006/0185736 | A1 * | 8/2006 | Cavagna | 137/505.12 |
| 2008/0214952 | A1 * | 9/2008 | Mir et al. | 600/556 |
| 2008/0255523 | A1 * | 10/2008 | Grinberg | 604/192 |
| 2009/0071548 | A1 * | 3/2009 | Patterson et al. | 137/497 |

* cited by examiner

300

800

1000

1400

1700

1800

2000

2100

2300

2400

2500

2600

SINGLE COMPONENT TWO-STAGE REGULATOR

REFERENCE TO RELATED APPLICATIONS

This application is a CONTINUATION of and claims priority from co-pending application U.S. Ser. No. 12/651,896 entitled "A SINGLE COMPONENT TWO-STAGE REGULATOR," filed on Jan. 4, 2010, which itself claims priority from provisional application U.S. Ser. No. 61/247,943 entitled "A COMBINED TWO-STAGE MICRO-REGULATOR DEVICE," filed on Oct. 1, 2009, the entirety of both of which are hereby incorporated by reference herein.

FIELD OF THE INVENTION

This invention relates to an article for reducing the pressure of an input gas to a useable output pressure, which output pressure is predetermined at the factory. One application of the present invention is for use in SCUBA (Self-Contained Underwater Breathing Apparatus) applications, where it replaces the traditional two-component user-adjustable regulator.

BACKGROUND OF THE INVENTION

One and two-stage regulators are used in a wide variety of applications to control the flow of compressed gas from a high-pressure side to a low-pressure side in a manner that provides gas pressures suitable for the appropriate use at the application (low-pressure) side of the regulator. Various industries with applications requiring two-stage high-pressure breathable air regulators include SCUBA applications, medical oxygen therapy, emergency medical services, fire fighting, environmental hazard response, search and air rescue, among others.

In all of these applications, the purpose of the regulator is to take a high-pressure gas source, e.g. an air cylinder, and deliver the air or other gas to the user at useable pressure. To accomplish this, the gas must pass through a pressure reduction regulator. In current practice, the first stage is placed on a yoke attached to the tank and the second stage connects to the mouth piece as shown in FIGS. 1, 2 and 3. The first-stage takes incoming high pressure gas from the cylinder and reduces it to an intermediate pressure that is greater than the ambient pressure. The second stage, which fits into the user's mouth or mask, receives the intermediate pressure from the two hose lines connecting to the first stage and reduces it to a usable ambient pressure. Two hose lines are used for redundancy.

FIG. 1 shows a photograph of a traditional yoke 100 manufactured by Johnson Outdoors Inc. under the SCUBAPRO® name which forms the first stage of a traditional regulator. An inlet 101 receives gas from a tank (not shown) typically at 3,000 psi. Dual lines 105 carry output gas at a reduced intermediate pressure, typically ranging from 120 to 180 psi. Knob 103 holds the yoke to the tank; a pressure gauge is connected via line 107 and buoyancy control is connected via line 109.

FIG. 2 illustrates an example of a traditional two-component regulator 200 (SCUBAPRO®) and described in U.S. Pat. No. 4,862,884 (see FIG. 1). First stage 201 of the regulator is connected to the second stage 203 via a hose 205.

FIG. 3 illustrates an example of a traditional two-component regulator 300 in operation used for SCUBA diving (SCUBAPRO®) and described in U.S. Pat. No. 7,171,980 (see FIG. 1). First stage 301 of the regulator is connected to the second stage 303 via a hose 305. The first stage 301 attaches to the tank, while the second stage 303 goes into the user's mouth.

FIG. 4 illustrates an example of a traditional flat-shaped piston 400 used in the first stage to regulate pressure in a traditional regulator (SCUBAPRO®) and described in U.S. Pat. No. 7,171,980 (see FIG. 4). This schematic view shows the forces acting on a valve poppet while in an open (top) and a closed (bottom) position during operation of the regulator. In the closed position (bottom), the pressure applied to the right side of the piston face, element 403, closes the piston against the valve poppet 401. In the open (top) position, when the pressure reduces, the piston moves into the containment area 407 and air pressure flows around the container wall 405.

There are numerous problems associated with traditional designs, depending upon the particular application. For example, in SCUBA applications, the extreme cold encountered at deep diving depths may cause the first stage of the pressure regulators to freeze up and malfunction. The brass and chrome coating materials tend to cause the poppet valve to stick in the open or closed position at these cold temperatures which endanger the life of the diver. Another issue with these designs is that improper use of the adjustment knob could also pose a danger by the end user accidently changing the pressure out of the safe operating pressure range. Typically, first stage regulators require two components and two lines for redundancy due to the safety concern of product failure.

Accordingly, it would be an advancement in the state of the art to provide a two-stage micro-regulator by reducing the size of the regulator and eliminating the adjustment nozzle through fixed pressure settings defined during the manufacturing process. It would be a further advancement in the state of the art to produce both the first and second stages in a single cylindrical component, which can fit inside a user's mask or mouth piece, which provides body heat, hence preventing freezing.

BRIEF SUMMARY OF THE INVENTION

Accordingly, one embodiment of the present invention is a single-component two or more stage regulator for controlling a pressure and a flow rate of a gas. The regulator includes a cylindrical housing for holding the two stages having an ingress adapted for connection to a source of gas at a high input pressure and an egress adapted for supplying gas at a lower output pressure than said high input pressure; a first stage for reducing the pressure of the gas from said high input pressure to a fixed, factory pre-set intermediate pressure; and a second stage for reducing the pressure of the gas from the fixed intermediate pressure to the lower output pressure and regulating the flow rate of the gas out of the egress. Additional stages maybe added in this design if a smaller diameter size is required. Currently with the use of two stages, the diameter of the cylindrical housing can be manufactured to approximately 0.880 inches, which can easily fit into a traditional mouth piece.

Another embodiment of the present invention involves a non-user adjustable factory set intermediate pressure through use of an electron welded end cap.

Another embodiment of the present invention involves a first stage throttle tube containing the ingress for receiving the source of gas at the high input pressure.

Another embodiment of the present invention involves a first stage piston having a plug on an ingress side and an egress side of a predetermined shape, where the first stage piston is adapted to oscillate to open and close a gap between the first stage throttle tube and the first stage piston allowing gas to enter.

Another embodiment of the present invention involves a compressible material disposed between the first stage throttle tube and the first stage piston adapted to allow the piston to oscillate between an open position and a closed position.

Another embodiment of the present invention involves a plug made from a composite material.

Another embodiment of the present invention involves a spring made from a compressible material.

Another embodiment of the present invention involves memory foam made from a compressible material such as, but not limited to, polypropylene.

Another embodiment of the present invention involves the first stage piston oscillating in order to maintain the fixed intermediate pressure.

Another embodiment of the present invention involves the fixed intermediate pressure being determined by ratio of a surface area of the egress side of the first stage piston relative to a surface area of the ingress side.

Another embodiment of the present invention involves a first stage cylinder sleeve that creates a tight seal around the first stage throttle tube.

Another embodiment of the present invention involves a first stage cylinder end cap for holding the compressible material in place.

Another embodiment of the present invention involves one or more o-rings adapted to create tight seals between each component.

Another embodiment of the present invention involves manufacturing the regulator from stainless steel.

Another embodiment of the present invention involves a second stage, which includes a second stage throttle tube controlling the ingress, a second stage piston having a plug with an ingress end and a predefined shaped egress end, and a compressible material.

Another embodiment of the present invention involves a second stage piston oscillating in order to maintain the fixed output pressure.

Another embodiment of the present invention involves a spring attached to a push plate to control an opening and closing of the second stage piston.

Another embodiment of the present invention involves a second stage cylinder containing a factory set adjustment plate.

Another embodiment of the present invention involves a second stage cylinder end cap for sealing the factory set adjustment plate.

Yet another embodiment of the present invention involves a cylindrical, single component two-stage SCUBA regulator, comprising a cylindrical housing for holding the two stages having an ingress adapted for connection to a source of gas at a high input pressure and an egress adapted for supplying gas at a lower output pressure than said high input pressure, a first stage for reducing the pressure of the gas from said high input pressure to a factory pre-set intermediate pressure, and a second stage for reducing the pressure of the gas from said fixed intermediate pressure to the lower output pressure and for regulating the flow rate of the gas out of the egress.

Yet another embodiment of the present invention includes a method for regulating a pressure of a gas, including the steps of providing a two-stage regulator having a cylindrical housing, receiving a source of gas at a high input pressure, reducing pressure of the gas from said high input pressure to a factory pre-set intermediate pressure, reducing the pressure of the gas from said fixed intermediate pressure to a lower output pressure, and supplying the gas at the lower output pressure than said high input pressure.

Other embodiments of the present invention will become apparent in the detailed description of the invention.

BRIEF DESCRIPTION OF THE DRAWINGS

The invention can best be understood in reference to the attached drawings in which.

DETAILED DESCRIPTION OF THE INVENTION

Figure 7:
FIG. 7 shows a photograph of a U.S. one dollar bill for size reference (top), and an example of an assembled single component two-stage regulator (bottom) according to one embodiment of the present invention.

What separates the design of the present invention from existing SCUBA technology is that the mouthpiece contains the entire assembly of the first and second stage regulator in a small form factor that actually increases the allowable pressure tolerance. A higher pressure tolerance greater than the traditional 3,000 psi enables the use of much smaller tanks with the same, if not greater, amount of gas. A custom robotic manufacturing process creates the regulator to a size capable of fitting into a mouth piece as shown in FIG. 7 by comparison to the size of a U.S. one dollar bill. Instead of using brass-plated chrome, a custom high-quality stainless steel alloy improves every aspect of the quality, size, and weight of the regulator. Since the regulator actually fits into the mouth piece of the user, the human body provides heat to the regulator, which eliminates the freezing issues associated with current SCUBA designs. Due to the alloy and design, the regulator can easily handle the 3,000 psi pressure of a standard SCUBA tank or even higher pressures exceeding 10,000 psi from a custom-made tank.

Figure 1:
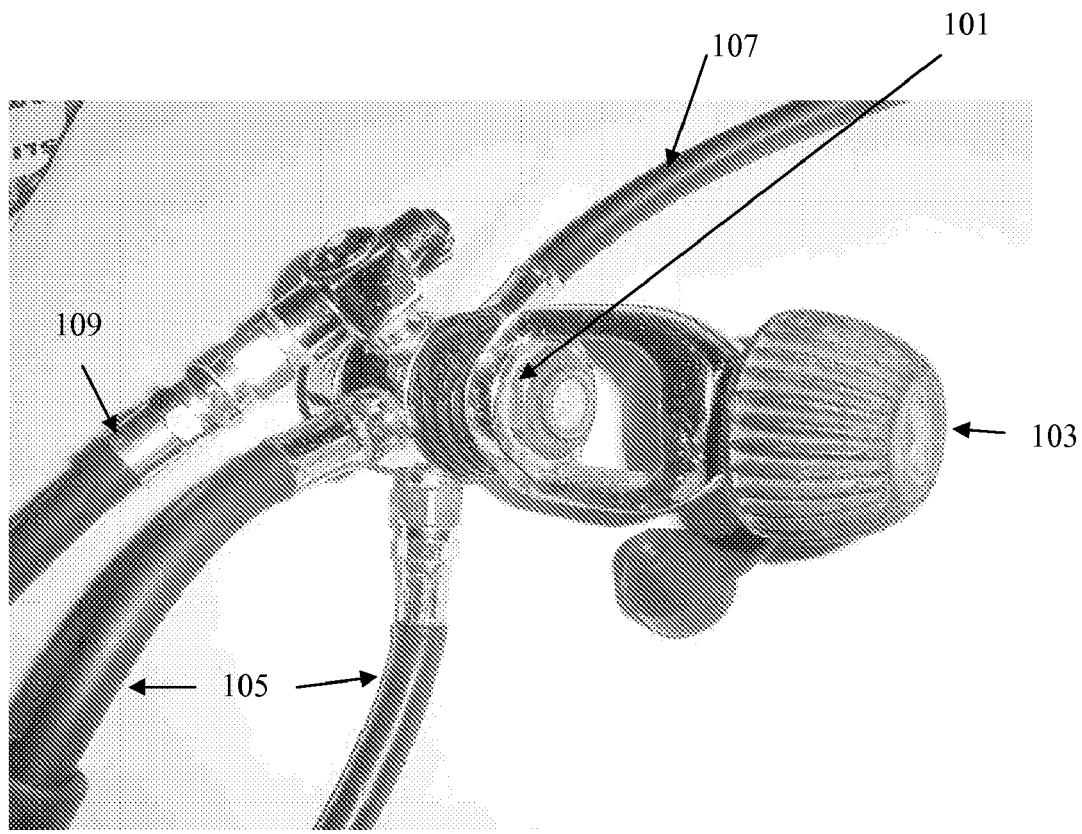
FIG. 1 shows a photograph of an example of a traditional yoke, which forms a first stage of a traditional two-stage regulator used in the SCUBA industry.
Figure 2:
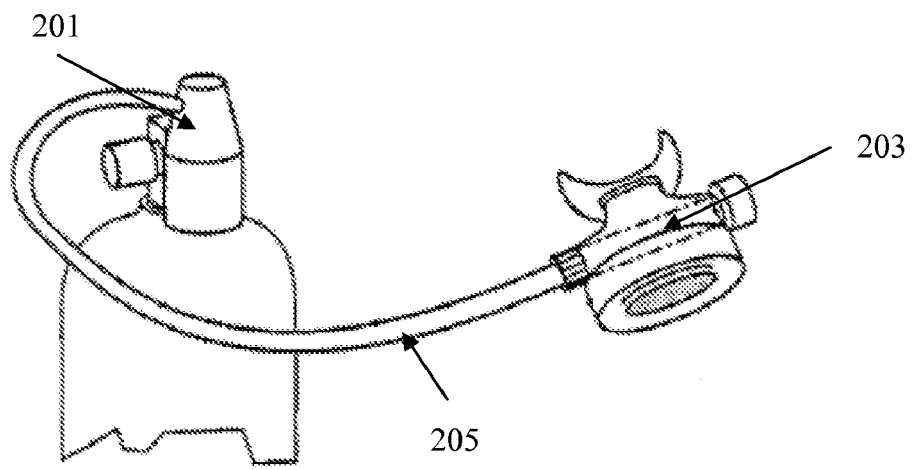
FIG. 2 illustrates an example of a traditional two-component regulator.
Figure 3:
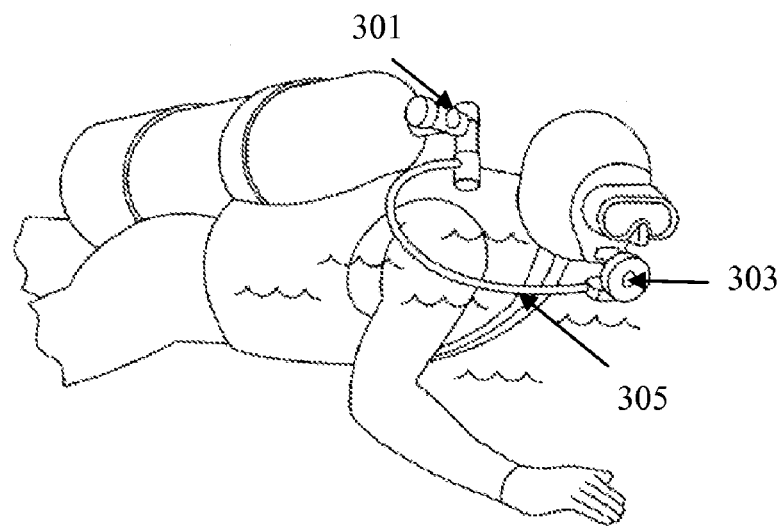
FIG. 3 illustrates another example of a traditional two-component regulator used for SCUBA diving during operations.
Figure 4:
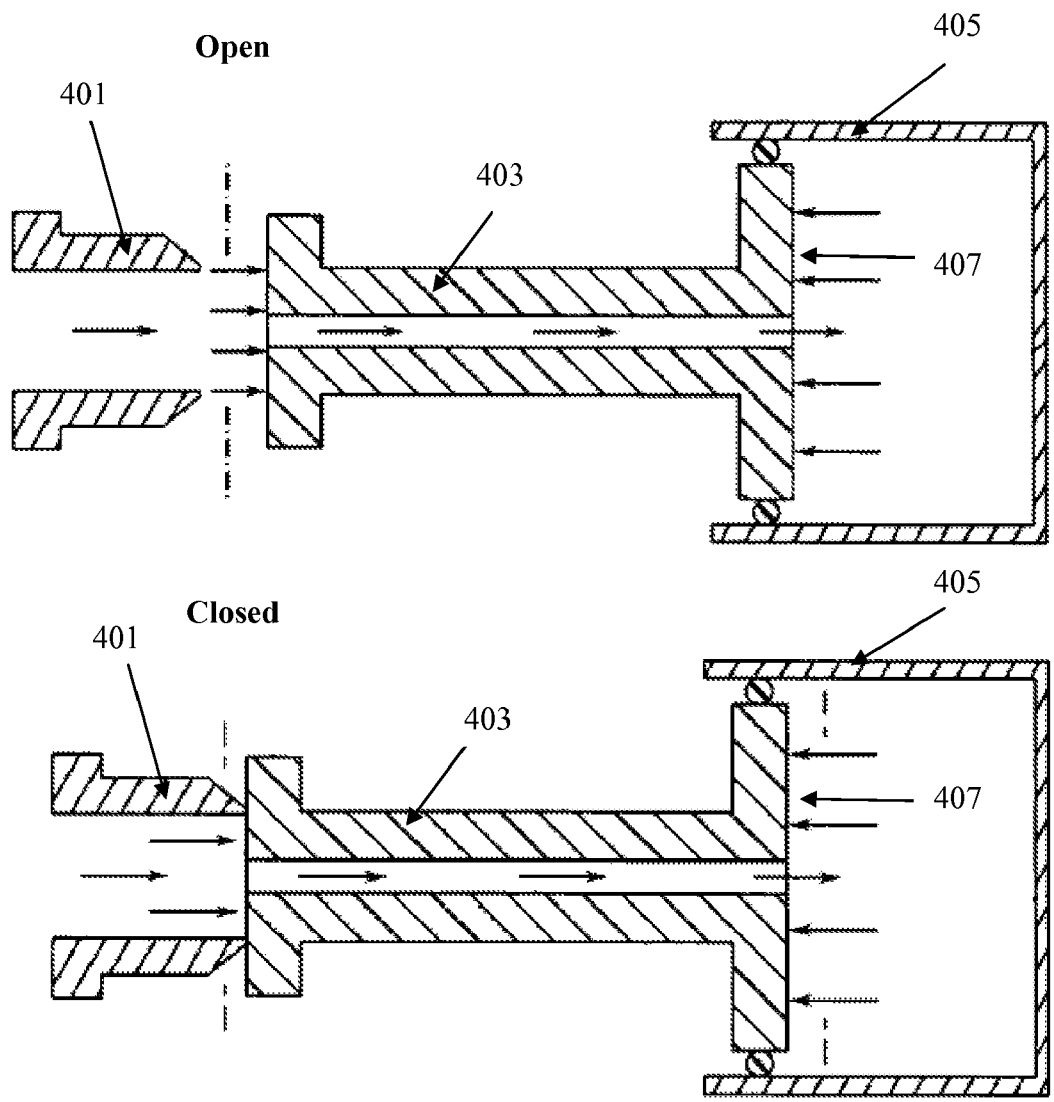
FIG. 4 illustrates an example of a traditional piston used to regulate pressure in a first stage of a traditional regulator.

The micro-regulator eliminates the need for an adjustment knob altogether by incorporating a fixed intermediate-pressure design. During the manufacturing process, different compressible materials (FIG. 6, element 1100) and pistons (FIG. 6, element 1200) change the pressure tolerances defined by the physical design elements of the components. For example, a regulator that would utilize a standard 3,000 psi tank would have a different spring and piston than a regulator designed for a custom 10,000 psi tank. The shape and surface area ratio of the left and right side of the piston of element 1200 determine the outlet pressure of the first stage. A clear distinction is made between the existing flat piston design shown in FIG. 4 and the uniquely shaped piston (element 1200) used in the micro-regulator.

The fixed intermediate-pressure design set during the manufacturing process eliminates the danger of incorrectly adjusting above or below the ideal ambient pressure. The first stage of the regulator eliminates the need for an intermediate pressure hose that existing designs require. The oscillation of the first stage piston 1200 into and away from the first stage throttle tube 800 allows the first stage to go from the high pressure at the tank to the factory preset fixed intermediate pressure. When the intermediate pressure falls below the factory preset pressure, there is a slight opening. When the fixed preset pressure is exceeded, the gap closes. The second stage reduces the fixed intermediate pressure to the useable ambient pressure as well as providing flow control and purge mechanisms, which ensures that the diver can inhale and exhale naturally regardless of the depth.

The second stage throttle tube 1400, and second stage piston's 1700 predefined shape and surface area, along with the compressible material characteristics (elements 1100 and 1900), modify the factory defined output pressure 507. The second stage piston 1700 oscillates into and away from the second stage throttle tube 1400 due to a compressible material 1900, such as a spring or memory foam, in order to maintain the factory defined output pressure 507. During manufacturing, the fine tuning of the output pressure occurs using the second stage adjustment nub 2400, which moves the second stage adjustment plate 2100 element. Once complete, the adjustment nub 2400 is permanently welded to prevent the end user from adjusting the output pressure 507. A second stage adjuster plate cap 2500 covers the weld to make the end piece flush. The second stage wishbones shown in FIG. 27 allow the user to purge the mask through two separate valves, which allow the user to displace excess water in the mask.

The metal assembly of parts is preferably a one piece construction. The metal is preferably a high quality stainless steel, such as 316L, which is used in the construction of the regulator.

Figure 5:
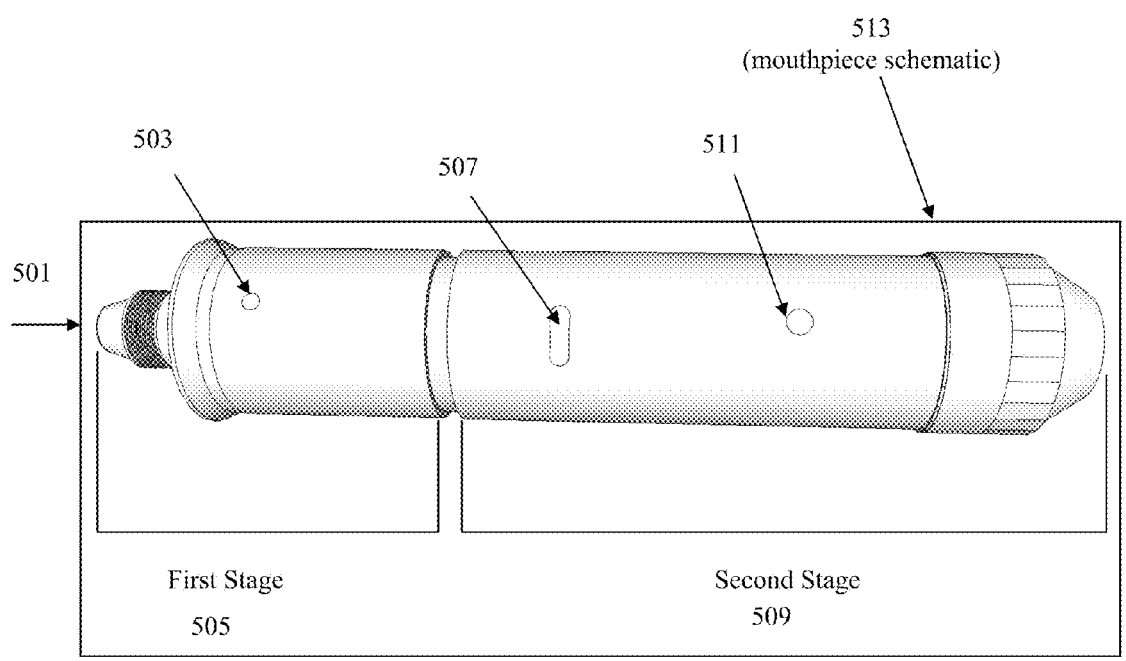
FIG. 5 illustrates an example of an assembled single-component two-stage regulator according to one embodiment of the present invention.

FIG. 5 illustrates an example of a cylindrical single-component two-stage regulator 500 assembled according to one embodiment of the present invention and located inside a mouthpiece 513 (shown in schematic form). High pressure gas enters at the ingress 501, passes through the first stage 505, where it is reduced to a factory assigned intermediate pressure, then enters the second stage 509, which reduces the pressure to the useable ambient pressure as well as regulating the flow of gas through the egress 507. Ambient pressure outside of the regulator enclosure enters through holes 503. The wishbone 2700 utilized for purging purposes (not shown in this figure) attaches through holes 511. Utilizing the ambient pressure of the user's mouth piece from the ambient pressure holes 503 allows this regulator to work at any depth. The cylindrical housing, the first stage 505, and the second stage 509 are all shown inside the mouthpiece schematic 513 as described in paragraph 46 above. The mouthpiece 513 is shown in schematic form only, and is not meant to represent a shape of an actual mouthpiece, which can vary from manufacturer to manufacturer.

Figure 6A:
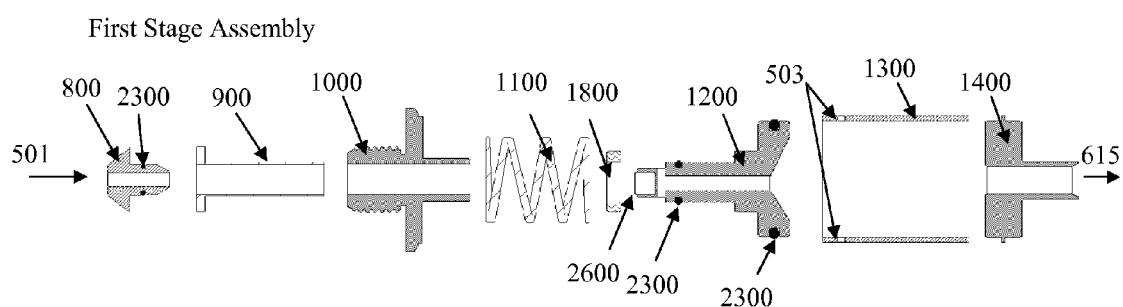
FIG. 6a illustrates an expanded view of a first stage (top) and a second stage (bottom) single component two-stage regulator according to the principles of the present invention.
Figure 6A:
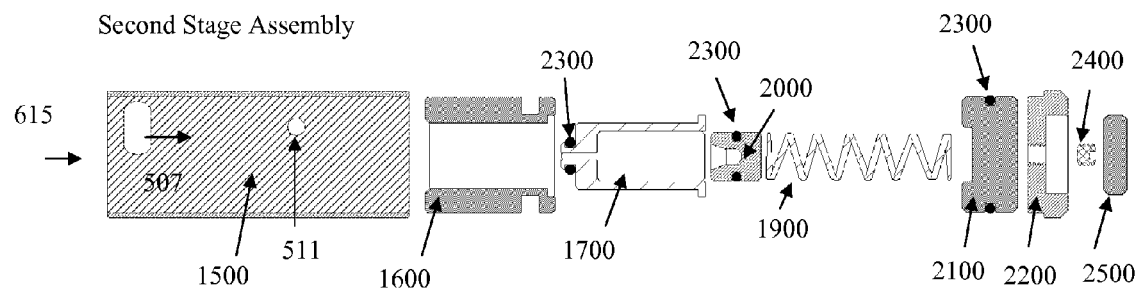

FIG. 6a illustrates an expanded view of a first stage (top) and a second stage (bottom) single component two-stage regulator according to the principles of the present invention. Gas enters at ingress hole 501. Intermediate pressure gas is represented as element 615. Ambient pressure enters through holes 503. Gas exits at the useable low pressure through egress hole 507. Wishbones 2700 attach at 511 for purging. Descriptions of each part of the two-stage regulator shown, preferred materials, and reference to full drawings can be found in Table 1. Cylindrical casing elements 1300 and 1500 provide a tight seal around the first and second stage regulators once electron beam welded during assembly. The use of o-rings 2300 seal the internal components of the regulator stages within the cylindrical casing (elements 1300 and 1500).

TABLE 1

Parts of the single component two-stage regulator

Figure 8:
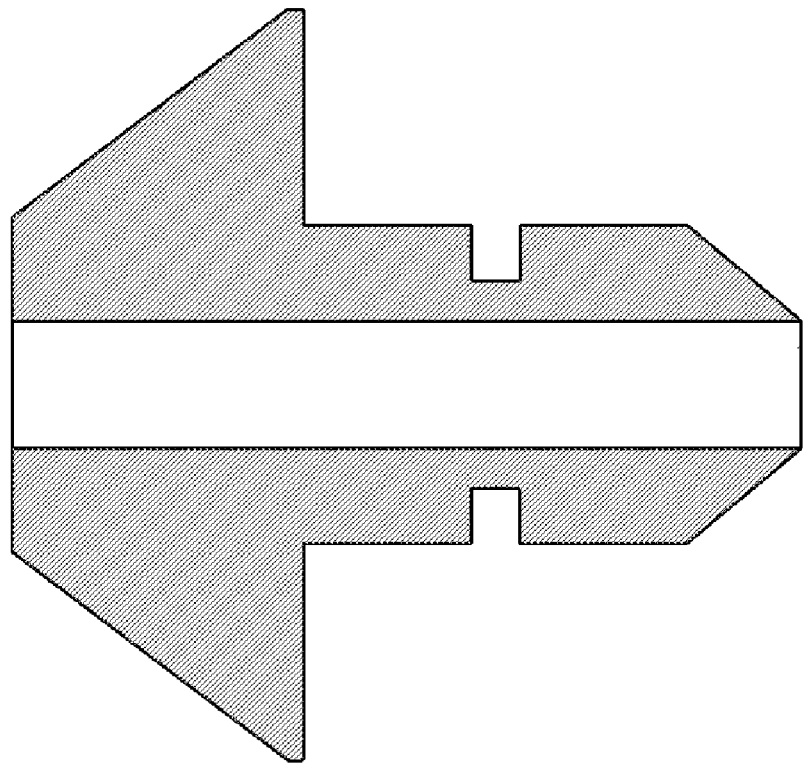
FIGS. 8-27 illustrate CAD drawings of each part of a single component two-stage regulator according to just one embodiment of the present invention.
Figure 9:
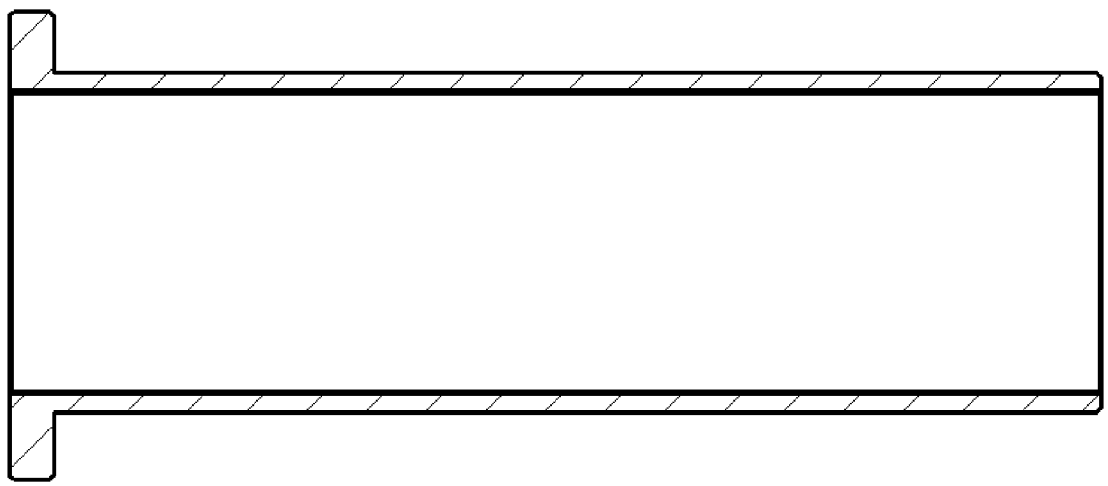
Figure 10:
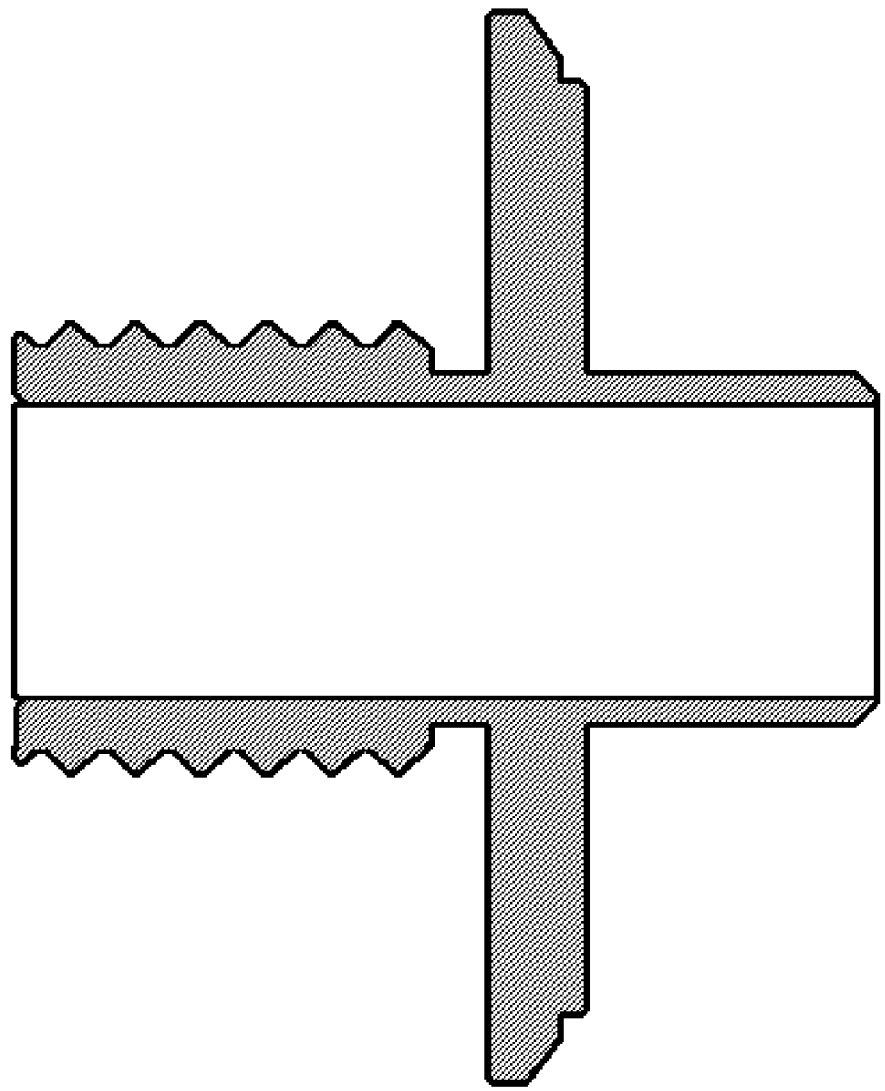
Figure 11:
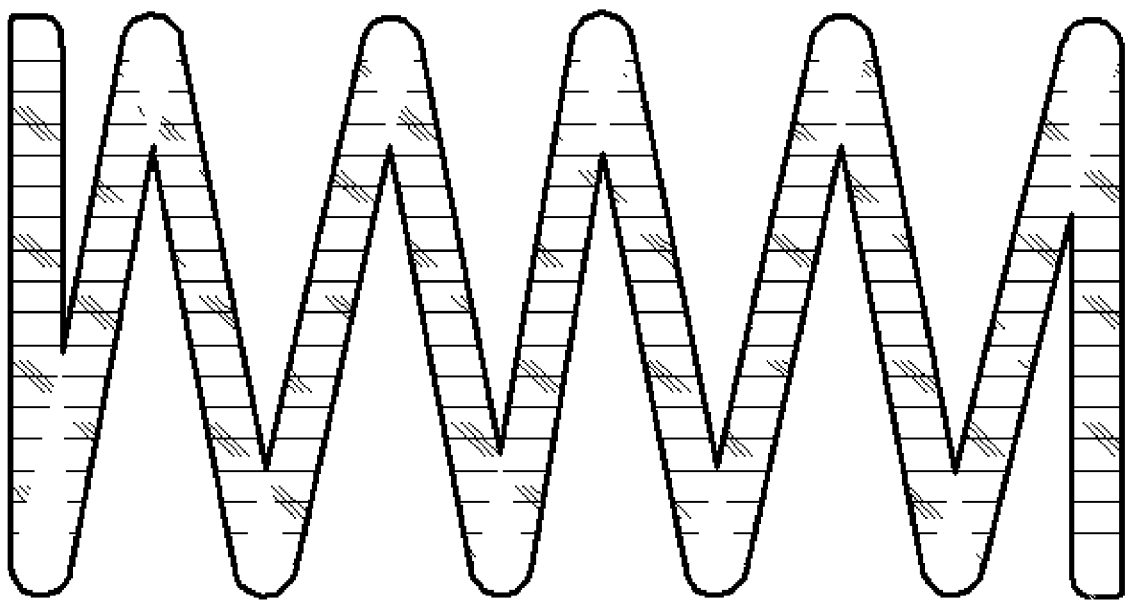
Figure 12:
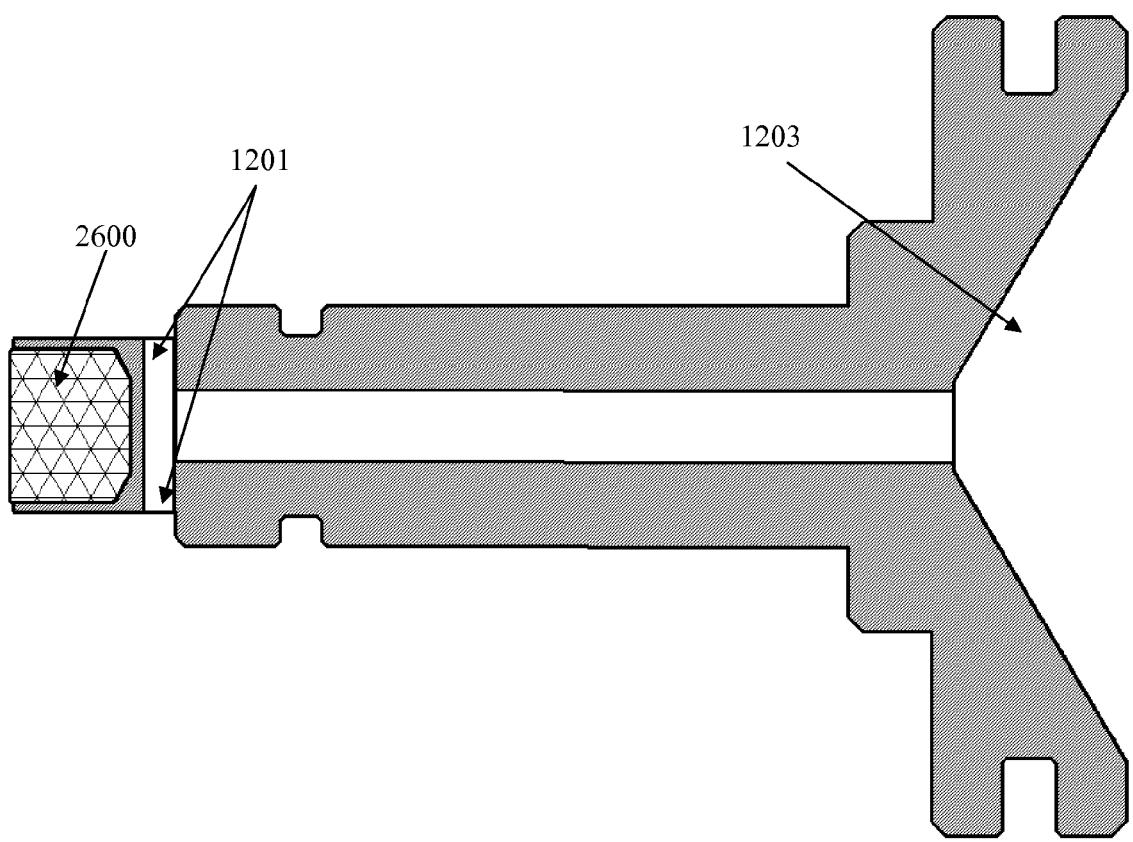
Figure 13:
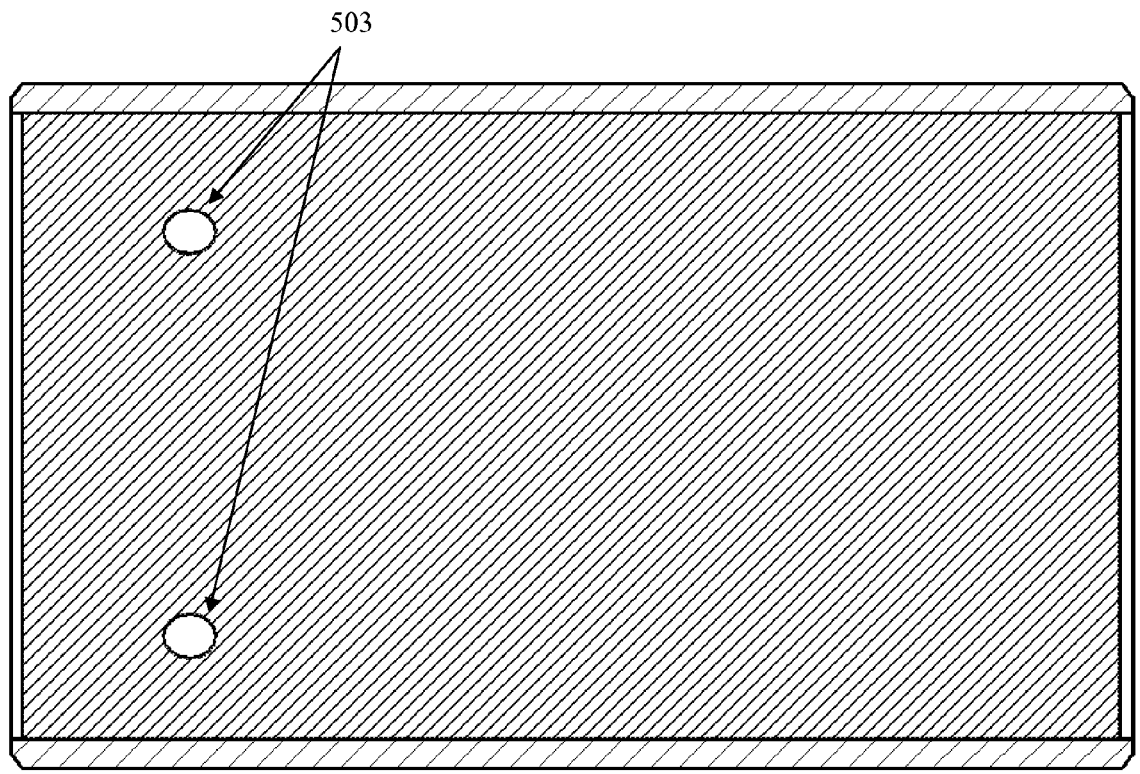
Figure 14:
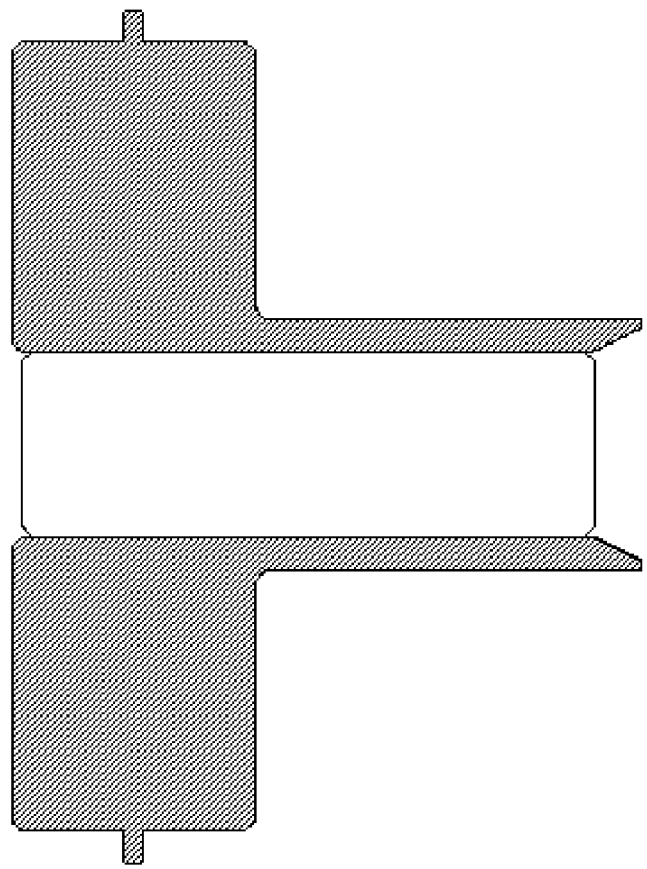
Figure 15:
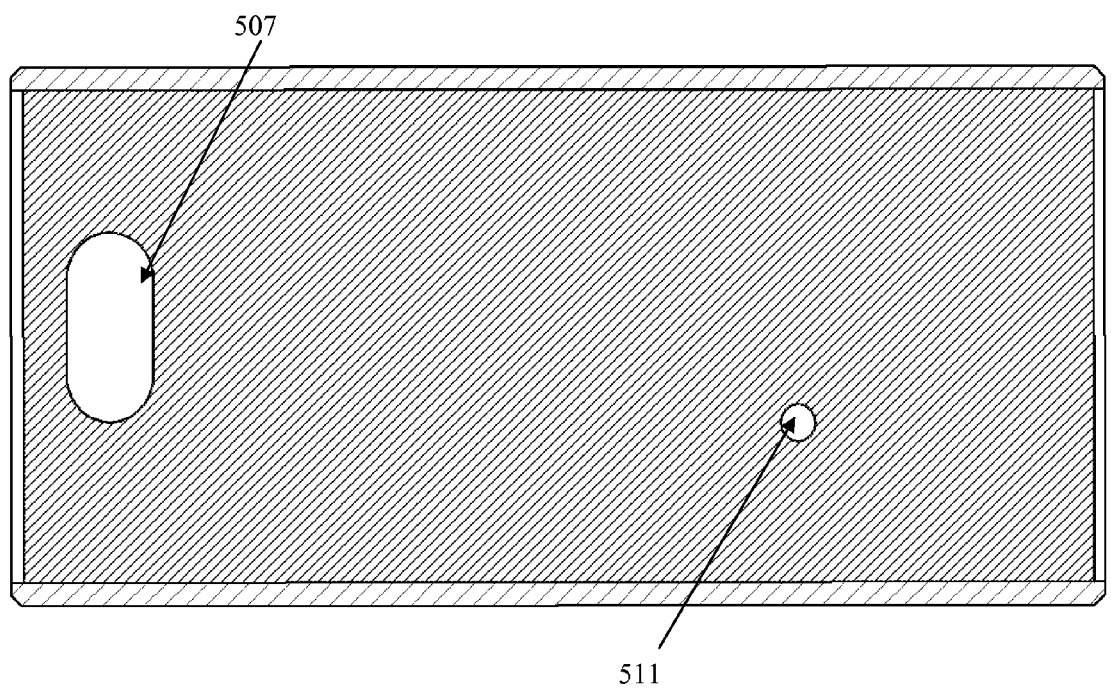
Figure 16:
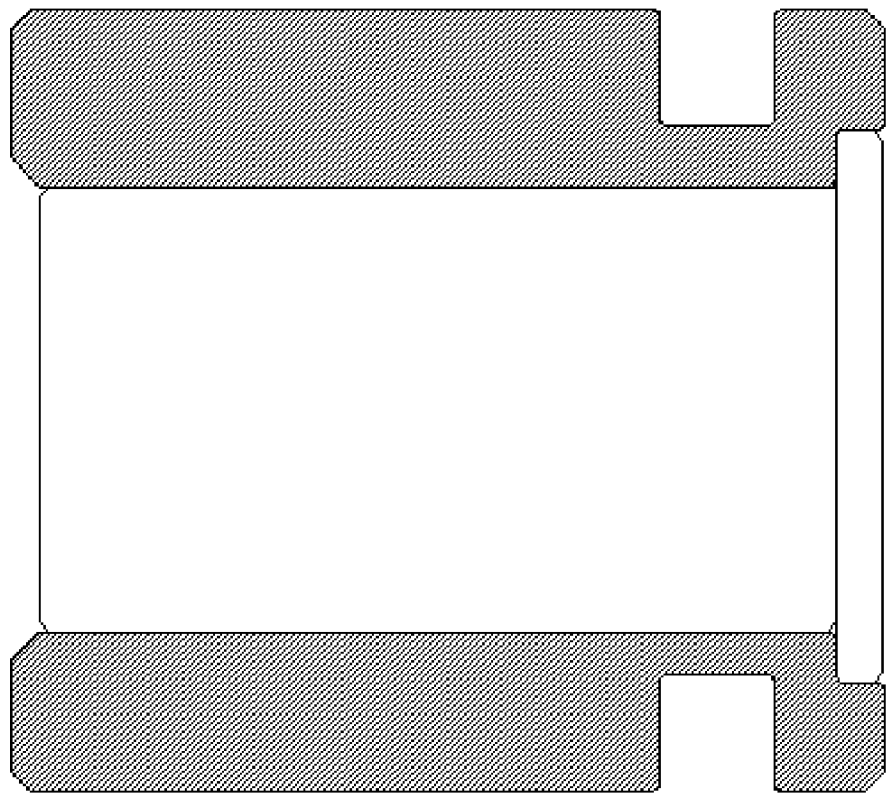
Figure 17:
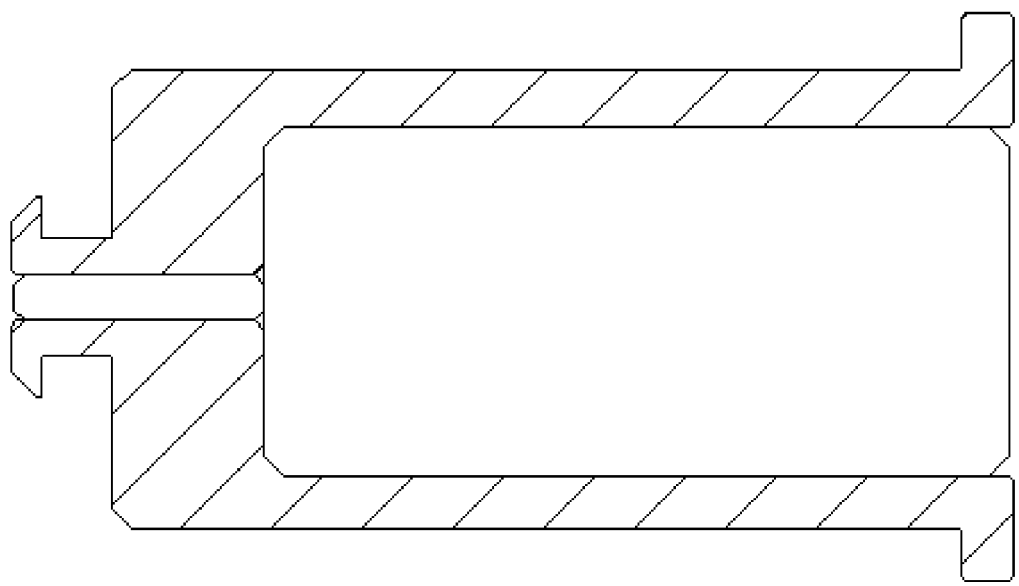
Figure 18:
Figure 19:
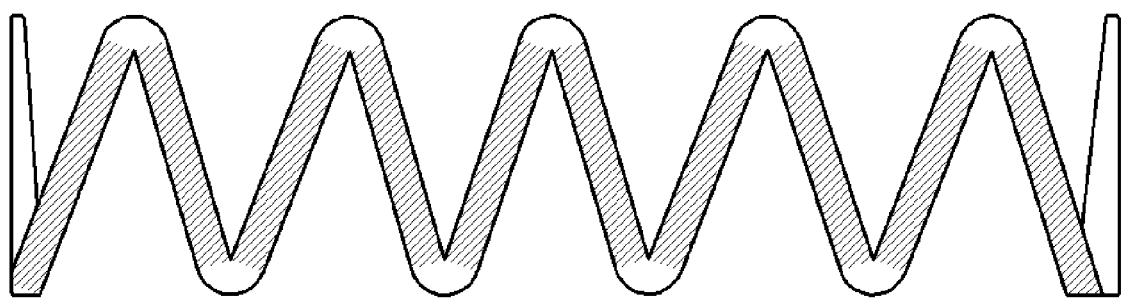
Figure 20:
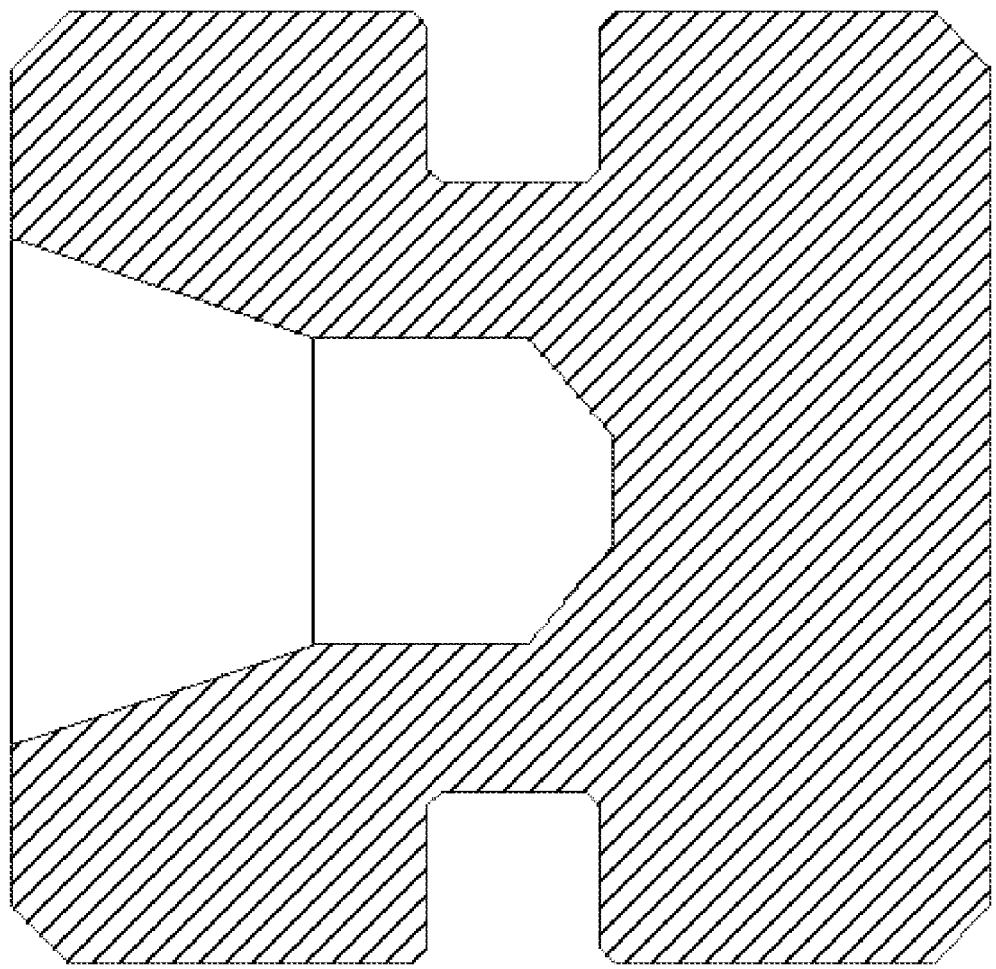

| FIG. Number | Part Number | Component Name/Description | Preferred Material |
| --- | --- | --- | --- |
| FIG. 8 | 800 | First Stage Throttle Tube | Stainless Steel |
| FIG. 9 | 900 | First Stage Cylinder Sleeve | Acetal |
| FIG. 10 | 1000 | First Stage End Cap/Cylinder | Stainless Steel |
| FIG. 11 | 1100 | First Stage Compressible Material | Stainless Steel or a memory foam (polypropylene) |
| FIG. 12 | 1200 | First Stage Piston<br>1201 - ingress holes<br>1203 - uniquely-shaped area to allow increased pressure to close the first stage piston | Stainless Steel |
| FIG. 13 | 1300 | First Stage Cylinder/Housing<br>1301 - ambient pressure holes | Stainless Steel |
| FIG. 14 | 1400 | 2$^{nd}$ Stage Throttle Tube/Mid Joint | Stainless Steel |
| FIG. 15 | 1500 | Second Stage Cylinder/Housing<br>1501 - egress holes | Stainless Steel |
| FIG. 16 | 1600 | Second Stage Piston Sleeve | Acetal |
| FIG. 17 | 1700 | Second Stage Piston | Stainless Steel |
| FIG. 18 | 1800 | First Stage Piston Shim | Acetal |
| FIG. 19 | 1900 | 2$^{nd}$ Stage Compressible Material | Stainless Steel or a memory foam (polypropylene) |
| FIG. 20 | 2000 | Second Stage Spring Push Plate | Acetal |

TABLE 1-continued

Parts of the single component two-stage regulator

Figure 21:
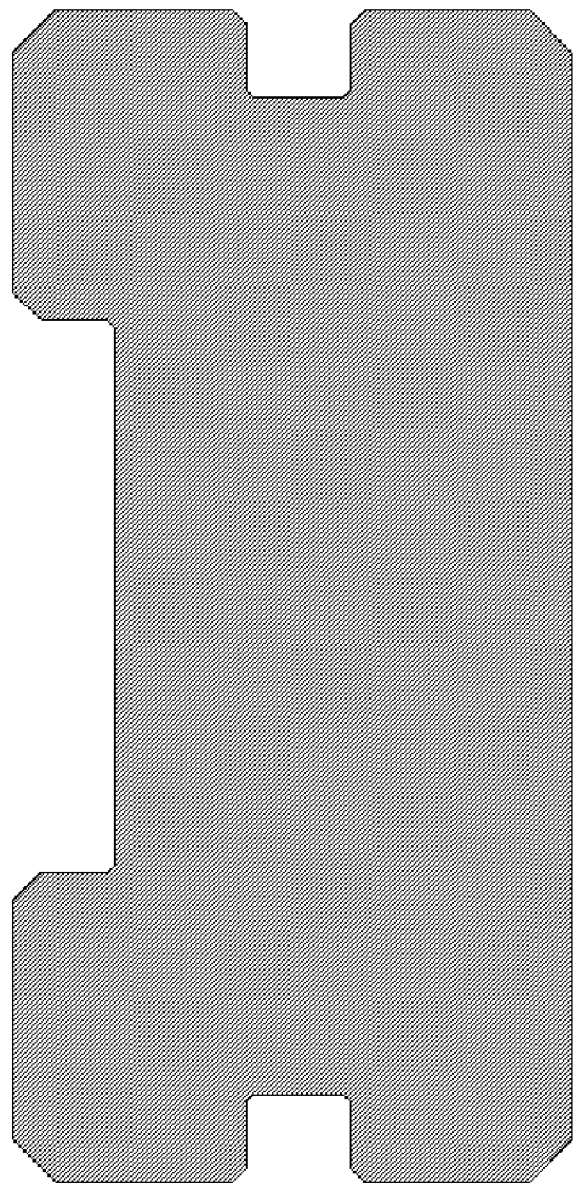
Figure 22:
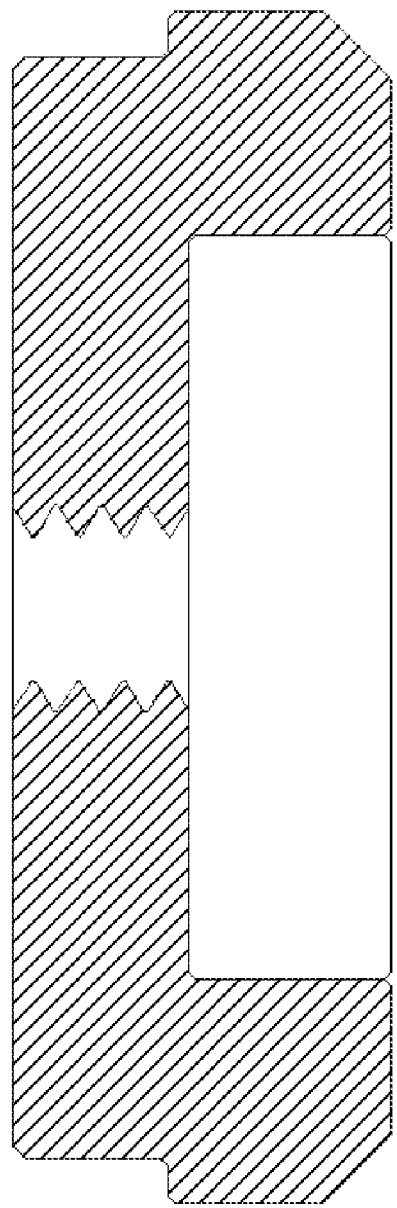
Figure 23:
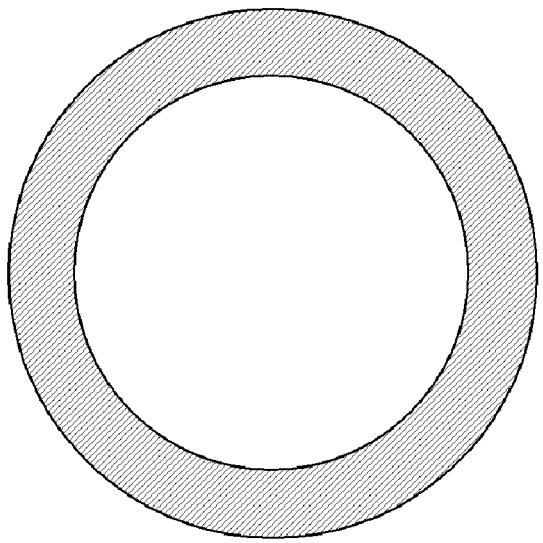
Figure 24:
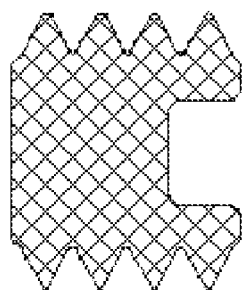
Figure 25:
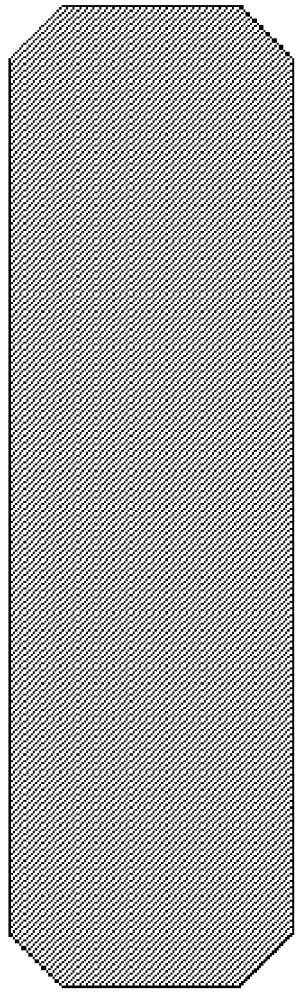
Figure 26:
Figure 27:
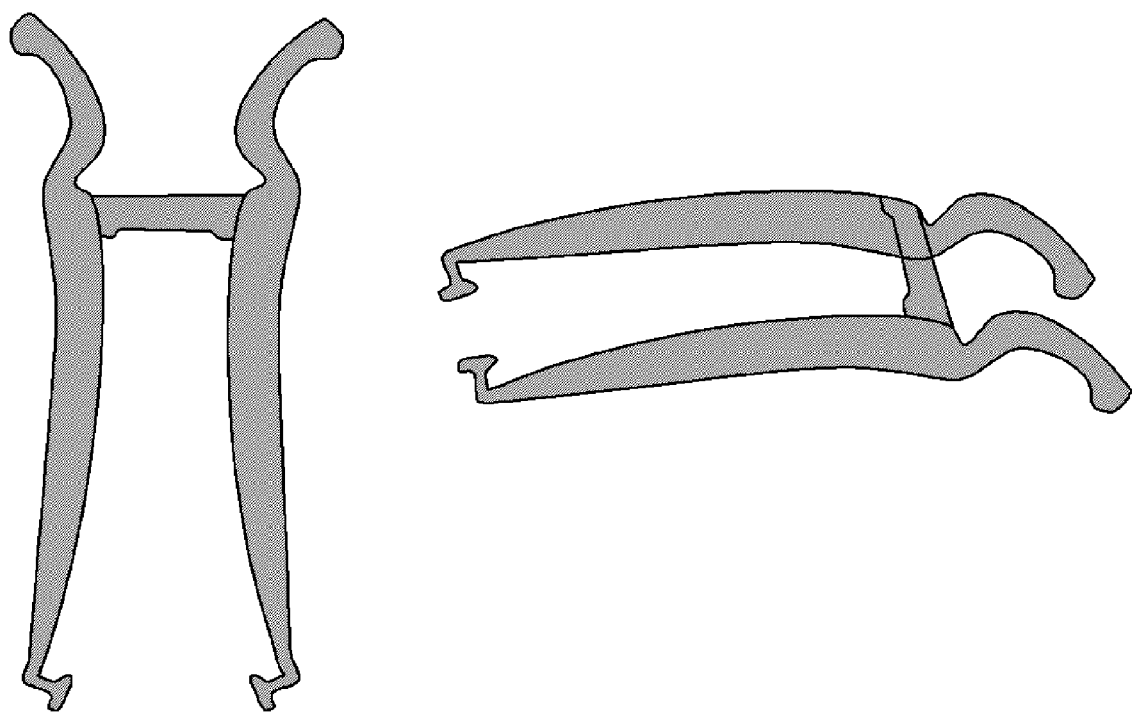

| FIG. Number | Part Number | Component Name/Description | Preferred Material |
|---|---|---|---|
| FIG. 21 | 2100 | Second Stage Adjustment Plate | Acetal |
| FIG. 22 | 2200 | Second Stage End Cap | Stainless Steel |
| FIG. 23 | 2300 | O-Ring | Elastomer |
| FIG. 24 | 2400 | Second Stage Adjuster Nub | Stainless Steel |
| FIG. 25 | 2500 | Second Stage Adjuster Plate Cap | Acetal |
| FIG. 26 | 2600 | First Stage Piston Seat | Torlon |
| FIG. 27 | 2700 | Second Stage Wishbone | Stainless Steel |

Figure 6B:
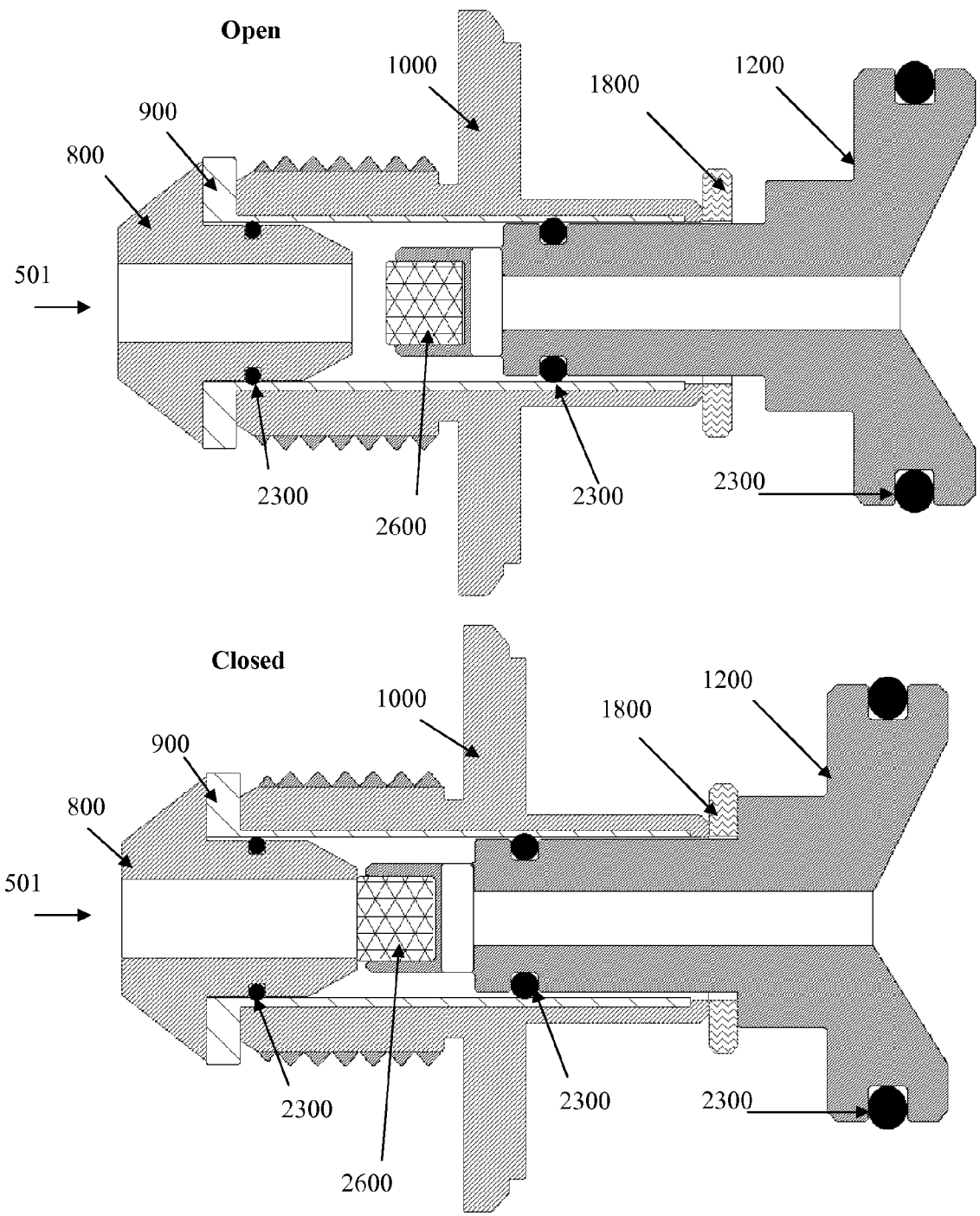
FIG. 6b illustrates an assembled view of a first stage regulator in an open (top) and a closed (bottom) positions.

FIG. 6b illustrates an assembled view of a first stage regulator in an open (top) and a closed (bottom) positions according to the principles of the present invention. Gas enters at ingress element 501. Descriptions of each part of the two-stage regulator shown, preferred materials, and reference to full drawings can be found in Table 1.

Figure 6C:
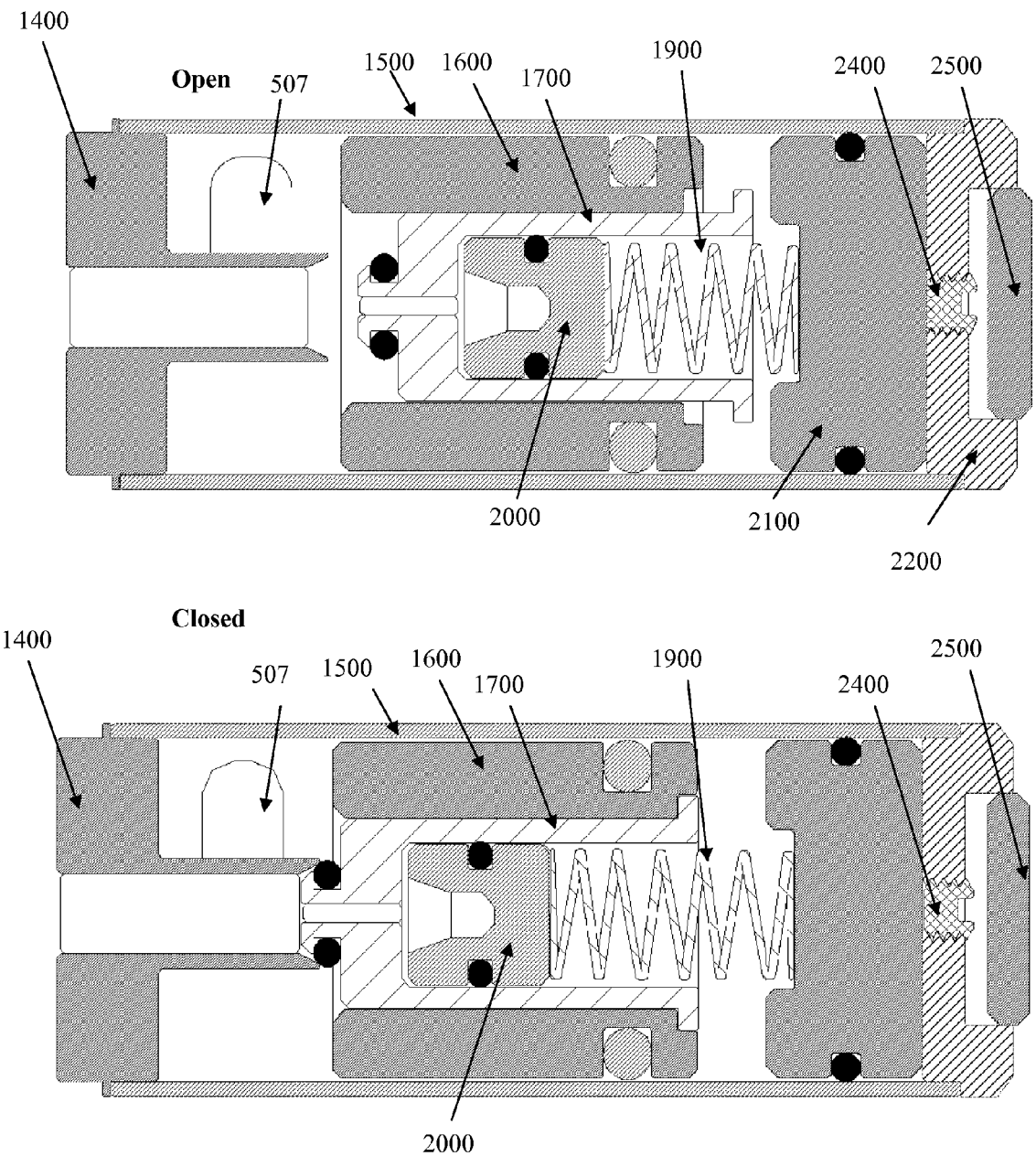
FIG. 6c illustrates an assembled view of a second stage regulator in an open (top) and a closed (bottom) positions.

FIG. 6c illustrates an assembled view of a second stage regulator in an open (top) and a closed (bottom) positions according to the principles of the present invention. Gas exits at a useable low pressure through egress holes 507. The second stage piston 1700 remains closed by the second stage compressible material 1900 and the second stage push plate 2000 until the intermediate pressure reaches the desired factory set output pressure and moves the piston open. Descriptions of other parts of the two-stage regulator shown, preferred materials, and reference to full drawings can be found in Table 1.

Figure 6D:
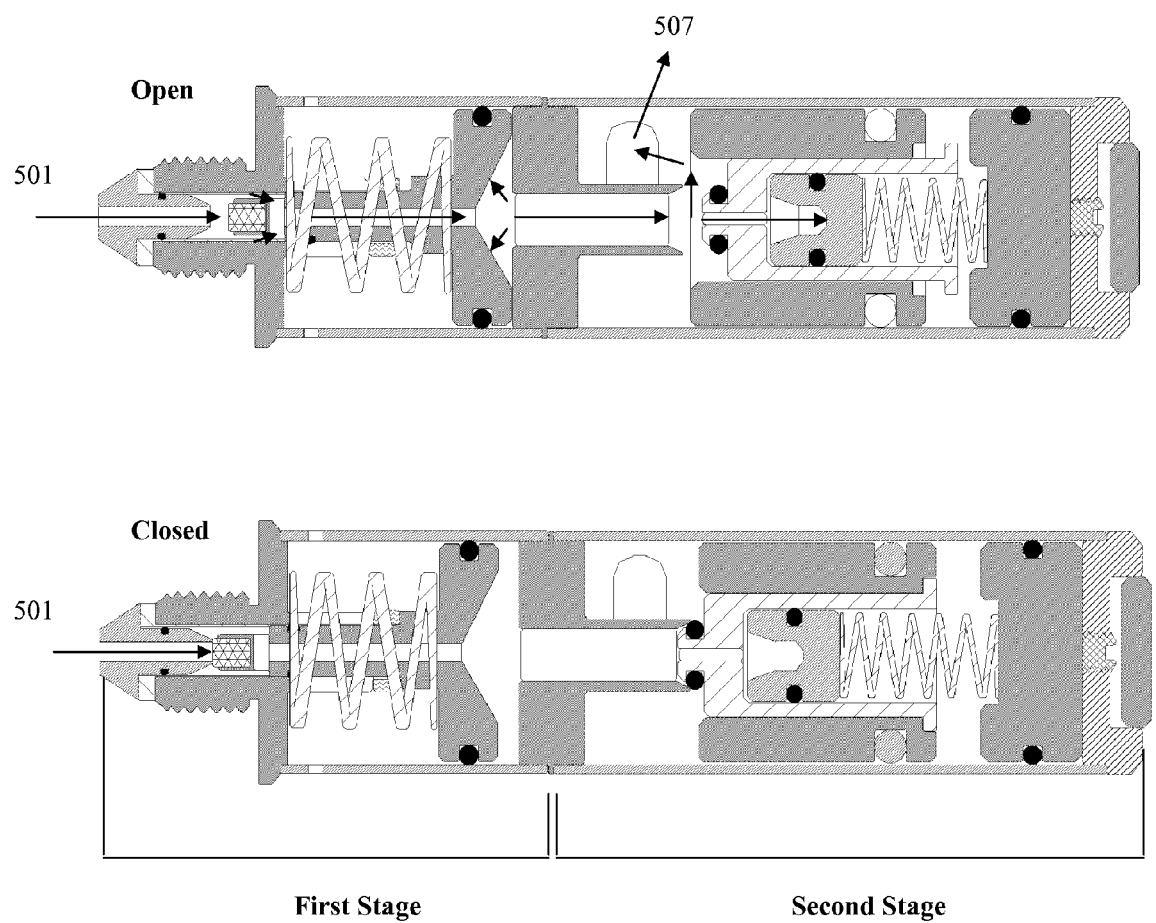
FIG. 6d illustrates flow of gas through an assembled view of the combined regulator in an open (top) and a closed (bottom) positions.

FIG. 6d illustrates flow of gas through an assembled view of a single component two-stage regulator according to the principles of the present invention. Gas enters at ingress holes 501 via a tank hose (not shown). The compressible material (for example, a spring) pushes outwards onto a first stage piston. The gas pushes the first stage piston closed, while the compressible material pushes the first stage piston open. The second stage piston 1700 oscillates due to a compressible material 1900, such as a spring or memory foam, in order to maintain the factory defined output pressure 507.

FIG. 7 shows a photograph of a single component two-stage regulator (bottom), and a U.S. one dollar bill for size reference (top). As shown in FIG. 7, the unique single-component regulator is approximately the size of a human mouth, easily fitting into a SCUBA mask or mouthpiece.

FIGS. 8-27 illustrate CAD drawings of each part of a single component two-stage regulator according to just one embodiment of the present invention. Table 1 enumerates each component shown in FIGS. 8-27. The dimensions, proportions, and materials of the components shown in FIGS. 8-27 are illustrative of only a single embodiment of the present invention. The dimensions, proportions, and materials are shown for illustrative and explanatory purposes only, and are not intended to limit the scope of the invention in any way, which is defined solely by the appended claims.

Figure 28:
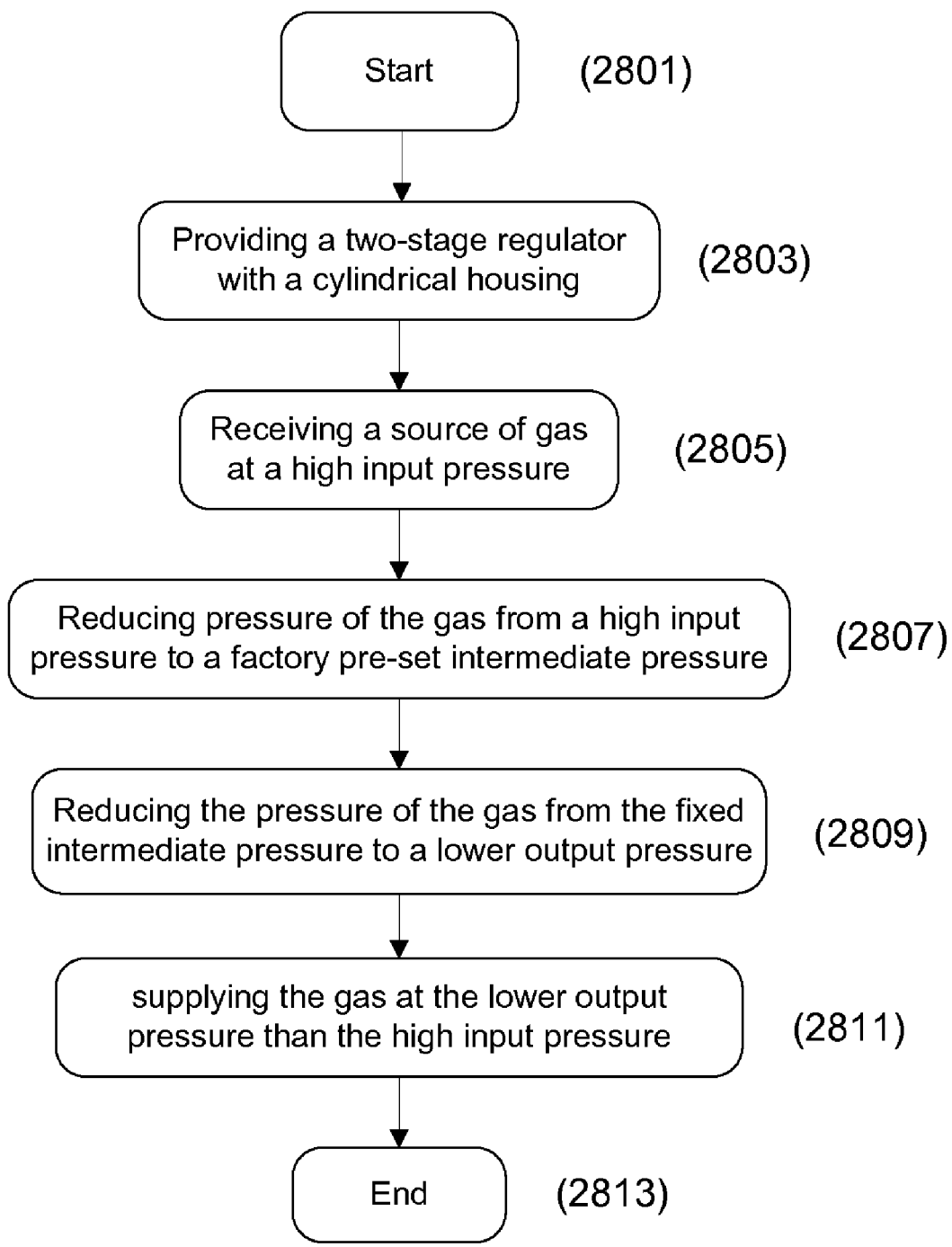
FIG. 28 illustrates a method for regulating a pressure of a gas according to one embodiment of the present invention.

FIG. 28 illustrates a flowchart of a process 2800 for regulating a pressure of a gas. The process begins at step 2801. At step 2803, a two-stage regulator having a cylindrical housing is provided. At step 2805, a source of gas at a high input pressure is received. At step 2807, the pressure of the gas is reduced from the high input pressure to a factory pre-set intermediate pressure. At step 2809, the pressure of the gas is further reduced from the fixed intermediate pressure to a lower output pressure. At step 2811, the gas at the lower output pressure is supplied for use. Finally, at step 2813 the process ends.

While the methods disclosed herein have been described and shown with reference to particular operations performed in a particular order, it will be understood that these operations may be combined, sub-divided, or re-ordered to form equivalent methods without departing from the teachings of the present invention.

While the present invention has been particularly shown and described with reference to embodiments thereof, it will be understood by those skilled in the art that various other changes in the form and details may be made without departing from the spirit and scope of the present invention.

What is claimed is:

1. A regulator-mouthpiece having a regulator for controlling pressure and flow of a gas in a Self-Contained Underwater Breathing Apparatus (SCUBA), comprising:
   a mouthpiece;
   a cylindrical housing located inside the mouthpiece for holding two stages having an ingress adapted for connection to a SCUBA tank and an egress adapted for supplying the gas to the mouthpiece at a lower useable pressure;
   a first stage located inside the cylindrical housing and inside the mouthpiece for reducing the pressure of the gas from a high input pressure to a regulated intermediate pressure; and
   a second stage located inside the cylindrical housing and inside the mouthpiece for controlling the flow of the gas at the regulated intermediate pressure at the egress to the mouthpiece and for purging gas out of the mouthpiece.

2. The regulator-mouthpiece of claim 1, further comprising:
   wishbones attached to the second stage adapted to purge the mouthpiece of water.

3. The regulator-mouthpiece of claim 1, wherein the regulated intermediate pressure is not adjustable by a user.

4. The regulator-mouthpiece of claim 1, wherein the first stage comprises:
   a first stage throttle tube containing the ingress for receiving the gas at the high input pressure;
   a first stage piston having a plug on an ingress side and an egress side of a predetermined shape, wherein the first stage piston is adapted to oscillate to open and close a gap between the first stage throttle tube and the first stage piston allowing gas to enter; and
   a compressible material disposed between the first stage throttle tube and the first stage piston adapted to allow the piston to oscillate between an open position and a closed position.

5. The regulator-mouthpiece of claim 4, wherein the compressible material is a spring.

6. The regulator-mouthpiece of claim 4, wherein the compressible material is a memory foam.

7. The regulator-mouthpiece of claim 4, wherein the first stage piston oscillates in order to maintain the regulated intermediate pressure.

8. The regulator-mouthpiece of claim 4, wherein a surface area of the egress side of the first stage piston relative to a surface area of the ingress side determines the regulated intermediate pressure.

9. The regulator-mouthpiece of claim 4, wherein the first stage further comprises:
   a first stage cylinder sleeve that creates a tight seal around the first stage throttle tube.

10. The regulator-mouthpiece of claim 4, wherein the first stage further comprises:
   a first stage cylinder end cap for holding the compressible material in place.

11. The regulator-mouthpiece of claim 4, wherein the first stage further comprises:
   one or more o-rings adapted to create tight seals between each component.

12. The regulator-mouthpiece of claim 4, wherein the regulator is manufactured from stainless steel.

13. The regulator-mouthpiece of claim 1, wherein a second stage cylinder contains a factory set adjustment plate.

14. The regulator-mouthpiece of claim 1, wherein a second stage cylinder end cap seals the factory set adjustment plate.

* * * * *